United States Patent [19]
Stanczyk et al.

[11] 3,848,813
[45] Nov. 19, 1974

[54] CONTINUOUS PROCESS FOR MECHANICALLY SEPARATING MATERIALS CONTAINED IN URBAN REFUSE

[75] Inventors: Martin H. Stanczyk, Marlboro; Paul M. Sullivan, Riverdale; Max J. Spendlove, Silver Spring, all of Md.

[73] Assignee: The United States of America as represented by the Secretary of the Interior, Washington, D.C.

[22] Filed: Mar. 9, 1973

[21] Appl. No.: 339,687

[52] U.S. Cl. ............... 241/19, 241/24, 241/29
[51] Int. Cl. ............................... B02c 19/00
[58] Field of Search ......... 241/19, 24, 29, 190, 193, 241/194, 195

[56] References Cited
UNITED STATES PATENTS

| | | | |
|---|---|---|---|
| 3,236,604 | 2/1966 | Pierson | 241/24 X |
| 3,477,649 | 11/1969 | Dalberg et al. | 241/24 |
| 3,524,594 | 8/1970 | Anderson et al. | 241/19 |
| 3,579,320 | 5/1971 | Pesses | 241/24 X |
| 3,650,396 | 3/1972 | Gillespie et al. | 241/24 X |
| 3,736,111 | 5/1973 | Gardner et al. | 241/24 |

*Primary Examiner*—Granville Y. Custer, Jr.
*Attorney, Agent, or Firm*—Roland H. Shubert; Frank A. Lukasik

[57] ABSTRACT

Urban waste, such as that collected from households in urban areas, is processed in the dry "as collected" state to recover ferrous metals, nonferrous metals, glass and paper fractions of suitable quality for sale and recycling. Waste is first shredded without balling or crushing tin cans and is thereafter subjected to a series of separations based upon differences in the physical properties of the waste materials.

13 Claims, 2 Drawing Figures

CONTINUOUS PROCESS FOR MECHANICALLY SEPARATING MATERIALS CONTAINED IN URBAN REFUSE

BACKGROUND OF THE INVENTION

It has been estimated that over 300 million tons of urban refuse is now generated and disposed of annually in this country. Of this total, most is disposed of in landfills and dumps. Only about 30 million tons is burned in municipal incinerators and even here the residues of incineration are usually discarded in landfills and dumps. Urban refuse can be considered as a mineral deposit, "urban ore" as the Bureau of Mines has characterized it, since the waste generated annually contains about 12 million tons of ferrous metals, over 1 million tons of non-ferrous metals and large quantities of glass, paper and plastics.

There have been sporadic attempts to recover and recycle components of urban refuse over the years. These attempts have ranged from enforced segregation of trash or refuse by individual households to demonstration scale plants handling refuse in its as-collected form. An example of the latter is the recycling plant at Franklin, Ohio which utilizes a wet process to separate some of the components of solid waste. A description of that process may be found in an article by William Herbert entitled "Solid Waste Recycling at Franklin, Ohio" published in the Proceedings of the Third Mineral Waste Utilization Symposium, pages 305–310, March 1972.

Another approach to the recovery and recycling of solid waste components is that previously taken by the Bureau of Mines. The Bureau has developed and demonstrated on a pilot plant basis a process to separate and recover metal and glass fractions from municipal incinerator residues. This process was described in a paper by Martin Stanczyk entitled "Application of Mineral Benefaction Techniques to the Extraction of Values from Municipal Refuse" presented at the October, 1972 meeting of the Society of Mining Engineers at Birmingham, Ala. A technical and economic evaluation of the process was published as Bureau of Mines Technical Progress Report No. 33, April, 1971. Probably the major limitations of this process lie in the fact that only a small percentage of municipal wastes are presently incinerated and that the incineration process precludes recovery and recycling of combustible portions of the refuse such as paper and plastics.

Hence it is an object of our invention to separate and recover materials of value from municipal refuse.

It is a specific object of our invention to treat urban wastes on an "as collected" basis to recover metal, glass and combustible fractions therefrom.

SUMMARY OF THE INVENTION

We have found that urban refuse may be subjected to a series of processing steps to separate and recover components of the refuse in a sufficiently high quality form so as to allow recycling and reuse of those component materials. The refuse is first shredded in a manner which precludes balling or folding of tin cans and similar objects and then is subjected to a series of separation steps which take advantage of differences in physical properties of the refuse components. Shredding may be accomplished by use of such devices as double-opposed chain or flail mills.

Components of the refuse which may be separated and recovered include a light ferrous metals fraction, a heavy ferrous metals fraction, a heavy non-ferrous metals fraction, a glass fraction, an aluminum fraction, a paper fraction and a plastics fraction.

DETAILED DESCRIPTION OF THE INVENTION

We have found that urban refuse in a dry "as-collected" state right out of trash cans and litter bags may be separated into a number of commercially valuable fractions. In accomplishing this result, we take advantage of various physical properties of materials found in refuse and separate the trash into component fractions by utilizing differences in those physical properties. Physical properties of trash materials utilized in our process include mass, magnetic susceptibility, density, size, shape, toughness and electrical conductivity.

Our invention may best be understood by reference to the accompanying drawings in which.

Figure 1:
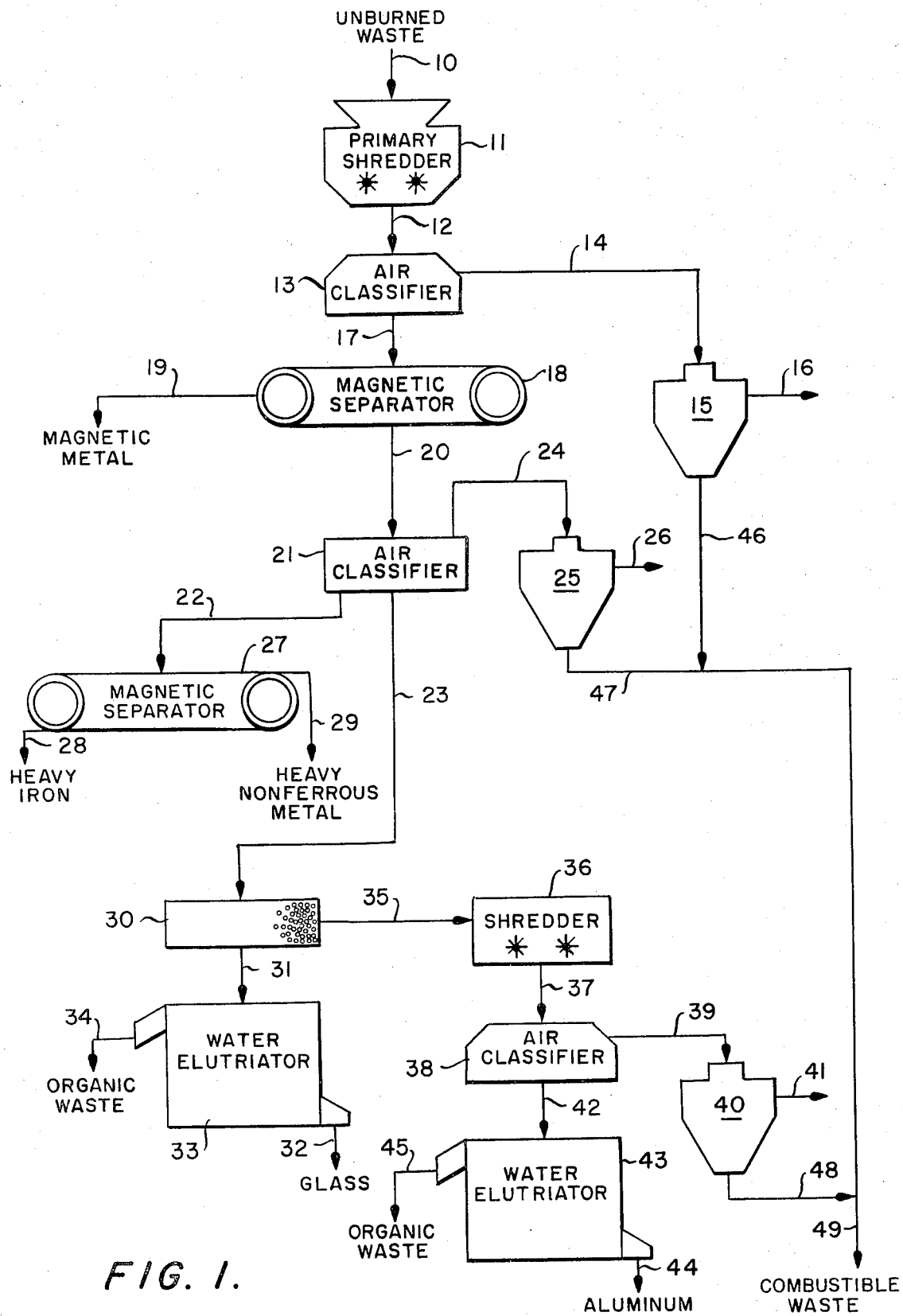
FIG. 1 is a diagrammatic flowsheet of our process in which paper, plastics and other light combustibles are recovered in a form suitable for combustion as a fuel or for conversion into other fuel forms as by gasification.

Referring now to FIG. 1, unburned refuse 10, such as that collected from households and businesses in an urban area, is fed into a primary shredder 11. Purpose of this initial shredding step is to physically liberate components of the refuse contained in bags and boxes while at the same time performing a tearing action to produce a relatively coarse shredded product. Proper control of the shredding step is mandatory in order to obtain efficient separation of refuse components in later processing steps. Glass containers and bottles must be shattered but an excessive amount of fines production is undesirable. Metals cans are damaged as little as possible. If they are balled up or folded, the cans trap other components of the refuse and are difficult to separate and further treat. Solution de-tinning, for example, is extremely difficult to accomplish if the tin-coated cans are sharply folded or balled up. Folded paper objects such as newspapers tend to be separated into shredded sheets but tightly bound magazines and the like may survive this shredding step in a somewhat more complete form, being ripped into a number of sections. In many cases, such partial comminution of magazine stock is desirable since it allows for a later separation of newsprint from magazine stock. In all cases, excessive production of very fine fragments is undesirable. All urban wastes contain occasional massive metal objects such as cooking utensils, discarded appliances, auto parts and the like. It is necessary that objects such as these can pass through shredder 11 without causing damage to the machine.

All of these criteria are met by a shredding device known as a double-opposed flail mill or chain mill. Such mills comprise a series of pivoted flails or chains attached to rotating cylinders. Two sets of counterrotating flails or chains produce a shredding or shattering action as refuse is passed through the mill between the flails. Conventional types of impact mills, such as hammer mills, are unsuitable since cans, sheet metal, foil and the like are balled up trapping other components of the refuse.

Shredded waste 12 is then passed to air classification or pneumatic separation means 13 wherein a light fraction comprising mostly shredded paper and plastic film is removed from the shredded waste. Separation means 13 may conveniently comprise a belt conveyor positioned beneath the discharge of shredder 11 and having a covering hood. The hood has the secondary purpose of controlling dust produced by operation of shredder 11. Suction is created by a fan pulling through a cyclone 15 where the entrained light refuse is collected. Conduit means 14 communicates between cyclone 15 and the hood portion of separation means 13. The air stream 16 exhausted from cyclone 15 is preferably further treated to remove fine particulates, as in a bag house (not shown) before release to the atmosphere.

After passing through separation means 13, the remaining shredded waste 17 is subjected to a magnetic separation 18 wherein most of the ferrous metals are removed. In practice, a suspended belt magnetic separator has been found appropriate. Essentially all of the light ferrous metals comprising mostly cans and similar items are removed at this point and comprise a product fraction 19 which can be further shredded into potato chip shaped pieces and washed free of labels and residual food resulting in a product that is ideal for detinning or other processing. Nonmagnetic fraction 20 is passed to a primary air classifier 21 where it is separated into three fractions; a heavy fraction 22 comprising mostly massive metals, an intermediate fraction 23 comprising glass, aluminum, food wastes and other heavy organic materials and a light fraction 24 comprising mostly shredded paper and plastics not removed at classifier 13. Fraction 24 is collected in cyclone 25 and air stream 26 exhausted from the cyclone may be further treated to collect fine particulates before being released to the atmosphere. Primary classifier 21 may conveniently comprise a horizontal air elutriating system in which refuse stream 20 is dropped vertically into a horizontally moving air stream and is thereby assorted into various fractions. A description of such a horizontal air classifier appropriate for use with solid wastes is found in the Bureau of Mines Technical Progress Report No. 34, June, 1971.

Heavy fraction 22, comprising mostly massive metals, is preferably treated in magnetic separator 27 to obtain an iron or ferrous metal fraction 28 and a heavy, non-ferrous metal fraction 29. Fractions 28 and 29 represent concentrated scrap metal fractions and, when suitably cleaned, can be sold or further refined. Intermediate fraction 23 may be subjected to a further magnetic separation step to remove residual ferrous metal contaminants before it is passed to a physical sizing means such as trommel 30. While other sizing means may be used, it has been found that a trommel works well. The trommel comprises a rotating cylindrical screen open at the ends. Fraction 23 is delivered inside the trommel at one end. Fine material drops through the holes; coarse material is delivered out the other end. A hole diameter of about 2 to 2½ inches has been found appropriate. Trommel undersize stream 31 consists mostly of glass, food wastes, dirt and small amounts of other materials. Stream 31 may be further processed to yield a clean glass fraction 32 by treatment in water elutriator 33. An organic waste stream 34 is also produced in the water elutriation treatment.

In some cases it is advantageous to subject trommel undersize stream 31 to a second screening through three-fourths inch or 1 inch mesh. A second screening further concentrates the glass in the fine fraction while scalping off most of the organic waste that would otherwise go to the water elutriator. It is also possible to clean and concentrate the glass contained in stream 31 by other techniques. For example, stream 31 may be treated using standard mineral beneficiation methods and devices such as jigs and log washers. Stream 31 may also be subjected to a drying step and the glass fraction concentrated by air tabling.

Trommel oversize stream 35 is composed of a variety of materials including bones, leather, heavy plastics and paperboard, wood, rubber, unshredded magazine fragments and the like. This stream is passed to a second shredder 36 for additional comminution. Shredder 36 may be a cutter type machine which chops the refuse into pieces having a size preferably in the range of about 1 to 3 inches. Shredded product 37 is discharged into an air classifier or pneumatic separator 38. Light material, capable of being suspended and transported in an air stream, is removed from classifier 38 by way of conduit 39 and is collected in cyclone 40. Air stream 41 from the cyclone is preferably passed through a dust collector before being released to the atmosphere. Classifier 38 may be similar to classifier 13 or it may be of any other common type. A commercially available 3-stage aspirator has been found to work well in this application.

Heavy material stream 42 contains most of the aluminum metal content of the original urban waste in admixture with wood fragments, heavy plastics, bone fragments, rubber, leather and the like materials. Treatment of stream 42 in water elutriator 43 yields an aluminum concentrate 44 and an organic waster fraction 45.

Materials collected from the three cyclones are in dry form, are essentially completely combustible, and represent most of the paper, light plastics and fabric contained in the original waste. Combustible fraction 46, collected by cyclone 15, may be merged with fraction 47 collected by cyclone 25. These two fractions in turn may be merged with fraction 48 collected by cyclone 40. The three fractions comprise combustible waste stream 49 which may be burned for the recovery of heat energy. Alternatively, combustible waste 49 may be utilized for other purposes or converted to other forms. This waste stream, for example, may be gasified by known techniques to provide a fuel gas and other organic fractions. Organic waste streams 45 and 34, which otherwise present a disposal problem, can also be added to combustible waste 49 raising the total energy value of the mix with a small sacrifice in heating value per unit of mix.

Figure 2:
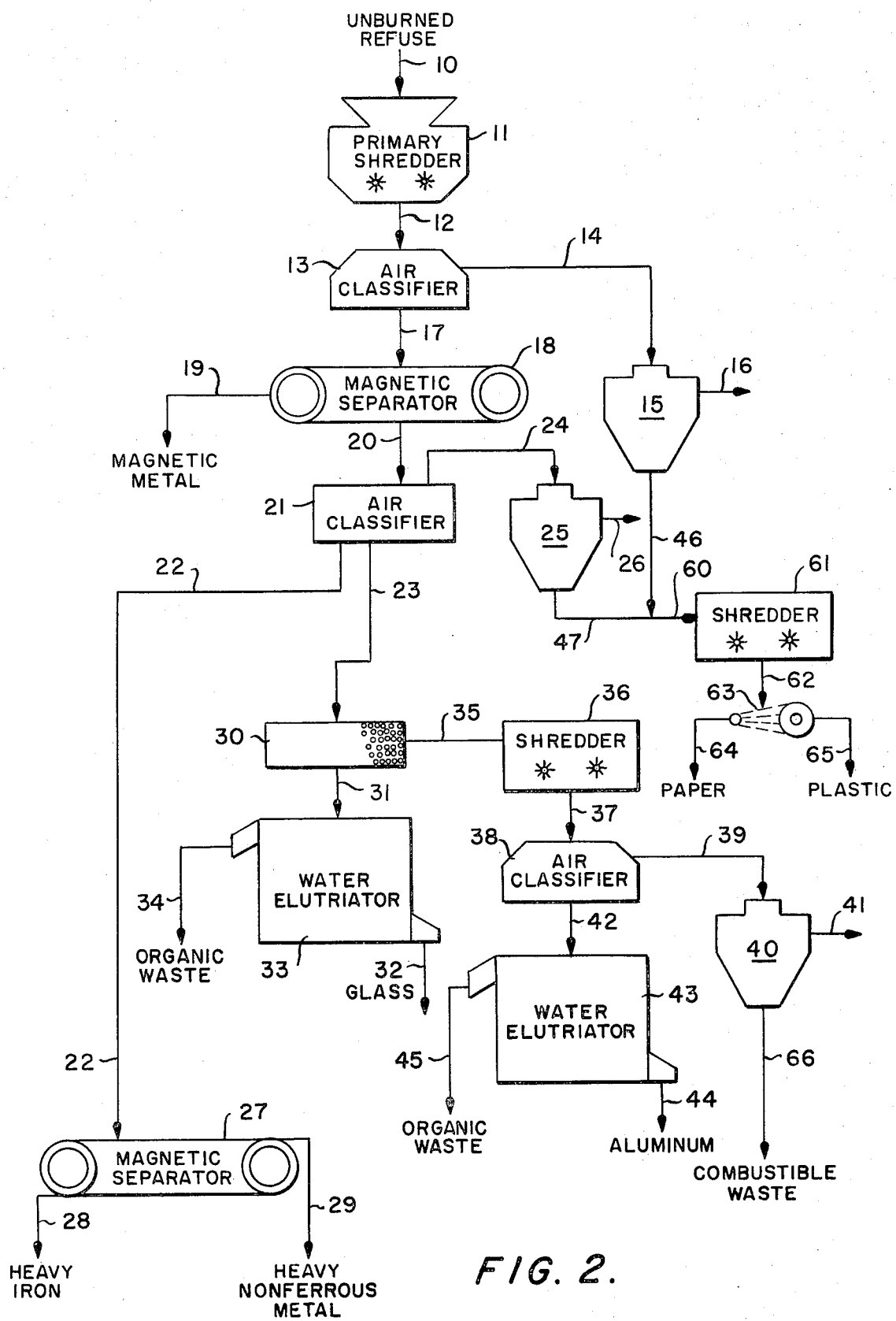
FIG. 2 is a modification of the process depicted in FIG. 1 in which a recyclable paper fraction and plastic fraction are recovered.

FIG. 2 represents an embodiment of our process adapted for the recovery of a clean paper fraction suitable for repulping and reuse. A mixed plastics fraction is also recovered which may have a potential for reuse in new plastic products. Elements depicted in this figure corresponding to similar elements of FIG. 1 carry the same identifying numeral. In this embodiment, fraction 46, collected by cyclone 15, and fraction 47, collected by cyclone 25, are merged to form mixed plastics and paper stream 60. Stream 60 is then fed to shredder 61 which is operated to produce paper and plastic fragments no larger than about 3 inches in maximum dimension. While not absolutely necessary to the functioning of our process, further comminution of the cyclone-collected materials in shredder 61 into pieces having sharply cut edges as opposed to frayed edges insures a much more efficient separation of paper from plastic.

Shredder product 62 is then subjected to the action of electrodynamic separator means 63. Means 63 may comprise a grounded, rotating metal drum onto which the shredded paper-plastic mixture 62 is fed. A wire electrode at high potential and spaced a short distance from the drum creates a corona. Paper is drawn toward the electrode while plastics adhere to the drum and are removed by brushing at a lower portion thereof. This device will routinely produce a paper concentrate 64 essentially free of plastic while producing a plastic concentrate 65 having as little as 10 percent or less paper. This device was described in a manuscript presented at the Society of Plastics Engineers regional technical conference at Chicago in October of 1972.

Combustible material 66, collected by cyclone 40, also contains substantial quantities of paper and plastics. However, paper collected in this cyclone consists of a high proportion of magazine stock which is generally undesirable for recycle and repulping because of its relatively high concentration of mineral fillers, plastics sizers and colored inks. Also, paper collected by cyclone 40 usually is more highly soiled by food wastes and the like than are the earlier collected fractions and this also reduces its desirability for recycling purposes. Combustible waste 66 may be utilized in the same fashion as waste stream 49 of FIG. 1. In this case also, organic waste streams 34 and 45 can be added to combustible waste 66 prior to burning or conversion.

The following example further illustrates our process and represents data obtained from a specific test on refuse collected along a typical route in Marlow Heights, Maryland. The raw refuse sample weighed approximately 1,730 pounds and was processed generally in accordance with the flowsheet represented by FIG. 1. Data obtained are set out in the following table.

TABLE

| Product | Percent of Original Sample (Weight) | Location[1] |
| --- | --- | --- |
| Ferrous metals | 7.9 | 19 |
| Air classifier heavies | 2.2 | 22 |
| Trommel undersize | 22.3 | 31 |
| First cyclone combustibles | 14.8 | 46 |
| Second cyclone combustibles | 36.0 | 47 |
| Third cyclone combustible | 15.1 | 48 |
| Air classifier heavies | 1.7 | 42 |

[1] Denotes location by element number on FIG. 1.

The trommel undersize stream 31 was further analyzed to determine the distribution of materials contained. Distribution of materials in this stream in weight percent was found to be: glass, 33.5; putrescible, 44.3; metals, 10.1; paper products, 10.1; plastics, 1.7 and miscellaneous, 0.3. Distribution of materials in heavies stream 42 separated in classifier 38 was: corrugated board and paper, 25.2; leather and rubber, 19.1; metals, 24.4; heavy plastics, 13.0; wood, 7.0, and fabric and putrescibles, 11.3.

We claim:

1. A process for the treatment of unburned urban refuse to separate and recover components thereof which comprises:
   a. shredding the refuse by subjecting it to a flailing action sufficient in intensity to physically liberate components of the refuse contained in bags and boxes, to shatter glass containers and bottles and to perform a tearing action on the refuse to produce a relatively coarse product but of insufficient intensity to cause folding or balling up of tin cans contained in the refuse;
   b. discharging the shredded product into a first pneumatic separation zone wherein light pieces of shredded refuse comprising paper and plastics are removed;
   c. subjecting the shredded refuse to a magnetic separation wherein a ferrous metal fraction comprising tin cans is removed;
   d. passing the refuse to an air classification zone and separating said portion into three fractions, a heavy fraction comprising massive metals, an intermediate fraction comprising glass, aluminum and heavy organic materials and a light fraction comprising paper and plastics;
   e. assorting the intermediate fraction by size to recover a small particle size fraction comprising glass and a large particle size fraction;
   f. comminuting the large particle size fraction and passing the comminuted product to a second pneumatic separation zone, and
   g. recovering from the second pneumatic separation zone a light fraction comprising paper and plastics and a heavy fraction comprising aluminum.

2. The process of claim 1 wherein light pieces of shredded refuse are removed from the first pneumatic separation zone in air suspension and are thereafter collected.

3. The process of claim 2 wherein said light fraction from the air classification zone is removed from that zone in air suspension and is thereafter collected.

4. The process of claim 3 wherein the light fraction from the second pneumatic separation zone is removed from that zone in air suspension and is thereafter collected.

5. The process of claim 4 wherein the light fractions collected from the first pneumatic separation zone, the air classification zone and the second pneumatic separation zone are merged to form a combustible waste stream containing substantially all of the paper and light plastics present in the unburned urban waste.

6. The process of claim 5 wherein the combustible waste stream is burned to recover heat energy.

7. The process of claim 3 wherein the light shredded refuse collected from the first pneumatic separation zone is merged with the light fraction from the air classification zone and the combined fractions are thereafter subjected to an additional shredding step.

8. The process of claim 7 wherein the shredded fractions from the first pneumatic separation zone and the air classification zone are subjected to an electrodynamic separation to produce a paper fraction substantially free of plastics and a plastics fraction.

9. The process of claim 3 wherein the heavy fraction comprising massive metals recovered from the air classification zone is subjected to a second magnetic separation to recover a heavy iron fraction and a heavy, nonferrous metals fraction.

10. The process of claim 4 wherein the small particle size fraction obtained in the assorting step is further purified by water elutriation to recover a clean glass product and an organic waste fraction.

11. The process of claim 10 wherein the organic waste fraction is combined with the light fraction recovered from the second pneumatic separation zone to form a combustible waste fraction.

12. The process of claim 4 wherein the heavy fraction recovered from the second pneumatic separation zone is further purified by water elutriation to recover a clean product fraction comprising aluminum and an organic waste fraction.

13. The process of claim 12 wherein the organic waste fraction is combined with the light fraction recovered from the second pneumatic separation zone to form a combustible waste fraction.

* * * * *